Dec. 16, 1969 A. D. FRIEDMAN ETAL 3,484,701

ASYNCHRONOUS SEQUENTIAL SWITCHING CIRCUIT
USING A SINGLE FEEDBACK DELAY ELEMENT

Filed March 31, 1967 2 Sheets-Sheet 1

FIG. 2

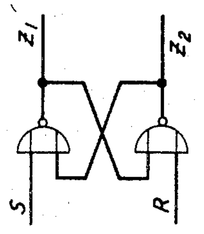

| R | S | $Z_2$ | $Z_1$ |
|---|---|---|---|
| 0 | 0 | MEMORY | |
| 0 | 1 | 1 | 0 |
| 1 | 1 | 0 | 0 |
| 1 | 0 | 0 | 1 |

FIG. 1

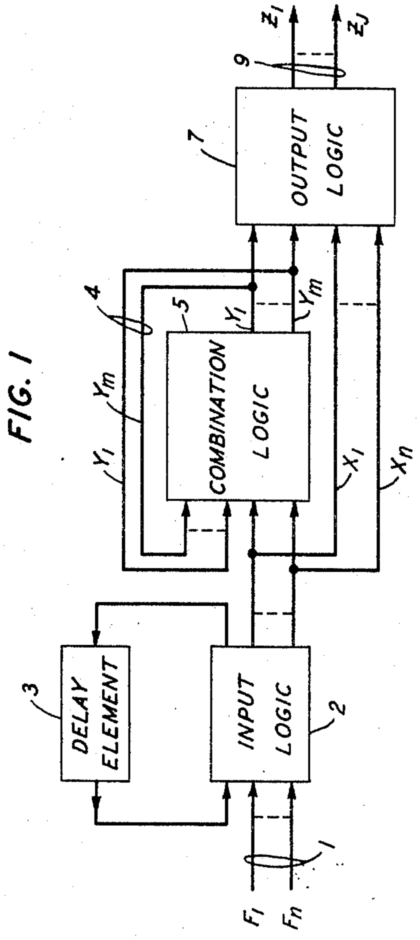

FIG. 5

| INPUT $X_1 X_2$ | 00 | | | 01 | | | 10 | | | | |
|---|---|---|---|---|---|---|---|---|---|---|---|
| | STATE | $Z_{1S}$ | $Z_{2S}$ | STATE | $Z_{1S}$ | $Z_{2S}$ | STATE | $Z_{1S}$ | $Z_{2S}$ | $Y_1$ | $Y_2$ |
| | $1_{SM}$ | M | M | 2 | 1 | 0 | $1_S$ | 0 | 0 | 0 | 0 |
| | $2_{SM}$ | M | M | $2_S$ | 1 | 0 | 3 | 1 | 1 | 0 | 1 |
| | $3_{SM}$ | M | M | 4 | 0 | 1 | $3_S$ | 1 | 1 | 1 | 1 |
| | $4_{SM}$ | M | M | $4_S$ | 0 | 1 | 1 | 0 | 0 | 1 | 0 |

FIG. 4

| INPUT X | 0 | | | 1 | | | | |
|---|---|---|---|---|---|---|---|---|
| | STATE | $Z_{1S}$ | $Z_{2S}$ | STATE | $Z_{1S}$ | $Z_{2S}$ | $Y_1$ | $Y_2$ |
| | $1_S$ | 0 | 0 | 2 | 1 | 0 | 0 | 0 |
| | 3 | 1 | 1 | $2_S$ | 1 | 0 | 0 | 1 |
| | $3_S$ | 1 | 1 | 4 | 0 | 1 | 1 | 1 |
| | 1 | 0 | 0 | $4_S$ | 0 | 1 | 1 | 0 |

INVENTORS: A. D. FRIEDMAN
P. R. MENON

BY R. O. Nimz

ATTORNEY

United States Patent Office 3,484,701
Patented Dec. 16, 1969

3,484,701
ASYNCHRONOUS SEQUENTIAL SWITCHING CIRCUIT USING A SINGLE FEEDBACK DELAY ELEMENT

Arthur D. Friedman, North Plainfield, and Premachandran R. Menon, Plainfield, N.J., assignors to Bell Telephone Laboratories, Incorporated, Berkeley Heights, N.J., a corporation of New York
Filed Mar. 31, 1967, Ser. No. 627,450
Int. Cl. H03k 19/06, 19/12, 19/20
U.S. Cl. 328—92 12 Claims

ABSTRACT OF THE DISCLOSURE

An asynchronous sequential circuit that provides hazard free operation for normal mode sequential functions is disclosed. The circuit operation allows several circuit input signals or feedback signals to change simultaneously without requiring the use of delay elements in the combination logic feedback paths. Circuit input signals are introduced into input logic which delays the transmission of any change in input. During the delay interval, the input logic applies an all zero signal pattern to the circuit's combination and output logic to insure that the circuit's internal state and output remain unchanged. Upon the expiration of the delay interval, the all zero signal pattern is altered, by the input logic, to reflect the current circuit input and the circuit's internal state and output change accordingly.

BACKGROUND OF THE INVENTION

Field of the invention

This invention relates to switching circuits and more particularly to asynchronous sequential switching circuits using a single delay element in a common feedback path.

Description of the prior art

A sequential circuit is a switching circuit in which the present output of the circuit is dependent upon both the present and past inputs to the circuit. In other words the circuit has a memory which retains information about the past inputs to the circuit. The information retained in this memory is combined with the present inputs to the circuit to produce the present circuit output.

An asynchronous sequential circuit is a sequential circuit that requires no clock pulses for its operation. This type of sequential circuit is desirable because it takes advantage of the basic operating speed of the circuit by eliminating the need for the circuit to wait for clock pulses. However, the elimination of clock pulses introduces the problem of insuring that the circuit operates according to its design, independently of the various transmission delays inherent in the circuit.

The classical asynchronous sequential circuit consists of present inputs, combination logic for combining the present inputs with feedback signals representing past inputs, and feedback paths from the output side of the combination logic to its input side, to obtain signals representing past inputs. The combination logic outputs are transformed into signals representing past inputs by including a delay element in each feedback path. In other words, if such a circuit has $n$ inputs and requires $m$ feedback paths it will also require $m$ delay elements.

The delay element in each feedback loop delays the transmission of any change in signal on the feedback lines for an interval equal to its delay. Consequently, the signals at the terminal end of a feedback loop, representing past input signals, remain unchanged after a change in present input signals for an interval equal to the delay in the loop. Thus the newly changed inputs, representing present inputs, may be combined with the signals on the terminal end of the feedback loops, representing past inputs, to determine the present output of the circuit. Such a circuit is shown in Haring, Sequential Circuit Synthesis, page 6 (1961).

While the above circuit configuration may be used to realize sequential functions, the use of a delay element in each feedback loop makes it expensive where numerous feedback loops are required. This has resulted in attempts to reduce the number of delay elements required in asynchronous sequential circuits.

A single delay asynchronous sequential circuit has been developed by S. H. Unger and is disclosed in the article "Hazards and Delays in Asynchronous Sequential Circuits," IRE Transactions on Circuit Theory, vol. CT–6, pages 12–25 (March 1959). All of the combination logic feedback loops in this circuit share a common delay element. This made possible by requiring that the circuit operation be restricted such that only one feedback variable changes at any given time. The output of the common delay element is then introduced into the input side of the combination logic to be combined with present input signals. While this circuit configuration can be used to realize any sequential function without introducing steady state hazards (i.e., a change in input resulting in the circuit going to the incorrect terminal internal state), transient hazards may occur if several input variables change simultaneously. That is, due to the various transmission delays inherent in the circuit, the internal circuit state, represented by the current combination logic output signals, may not change directly to the desired terminal internal state. Instead, for a given input change, the circuit may go through a succession of state transitions in reaching the desired terminal internal state. This, of course, may be reflected in the circuit output signals derived from internal circuit state, resulting in an unstable circuit output during transition periods. Additionally, if the present inputs to Unger's circuit are functions of a number of logic variables, only one of these variables may change at a time. Furthermore, only one of the combination logic feedback signals may change during any given circuit state transition.

Asynchronous sequential circuits have found applications in the data processing field. P. H. Bardell, Jr., Patent 3,241,122 issued Mar. 15, 1966 shows asynchronous sequential data processing circuits for processing ternary coded information. Similarly, F. J. Sparacio Patent 3,166,737 issued Jan. 19. 1965 discloses an asynchronous data processor.

SUMMARY OF THE INVENTION

It is an object of the present invention to increase the speed at which single delay element sequential circuits can operate.

It is a further object of the present invention to reduce the cost of circuits used to realize sequential functions which provide hazard free operation.

It is a more specific object of the invention to reduce the number of delay elements required in a circuit used to realize normal mode sequential functions which provides hazard free operation.

In accordance with the present invention, input signals are introduced into an input circuit which has a feedback path containing a single delay element. When the input signals change, the input circuit generates signals which result in the circuit's existing internal state and output remaining unchanged for an interval at least equal to the delay provided by the delay element in the feedback loop. When the delay interval expires, an enabling signal, which is transmitted over the feedback loop, allows the signals generated by the input circuit to be altered to reflect the change in input that has occurred.

These delayed signals are then introduced into combination logic where they are combined with the existing output signals of the combination logic, representing past circuit inputs, to determine the present internal state of the circuit. Anywhere from one to all but one of the output signals of the combination logic may be simultaneely altered as a result of the above combination. These altered output signals represent the present internal state of the circuit. They are combined by an output circuit which alters its output signals to indicate the change in the circuit input signals. The signals generated by the output circuit represent the present circuit output.

An advantage of this circuit is the savings in cost and increased reliability resulting from the reduction in the number of delay elements required to realize a normal mode sequential function and provide hazard free operation.

Another advantage of the circuit is that its speed of operation is increased as a result of allowing several input variables or several feedback signals to change simultaneously.

These and other objects and features, the nature of the present invention and its various advantages will be more fully understood upon consideration of the attached drawings and the following detailed description of the drawings:

FIG. 1 shows a functional block diagram of the asynchronous sequential circuit with *n* inputs and *j* outputs;

FIG. 2 discloses a flip-flop, and its truth table, of the nature used in the circuit output logic;

FIG. 4 is a flow table representing the normal mode sequential function which is realized by the logic in FIG. 3; and FIG. 5 shows the sequential function in FIG. 4 redefined to include a stable memory state in any state transition.

GENERAL DESCRIPTION

Figure 3:
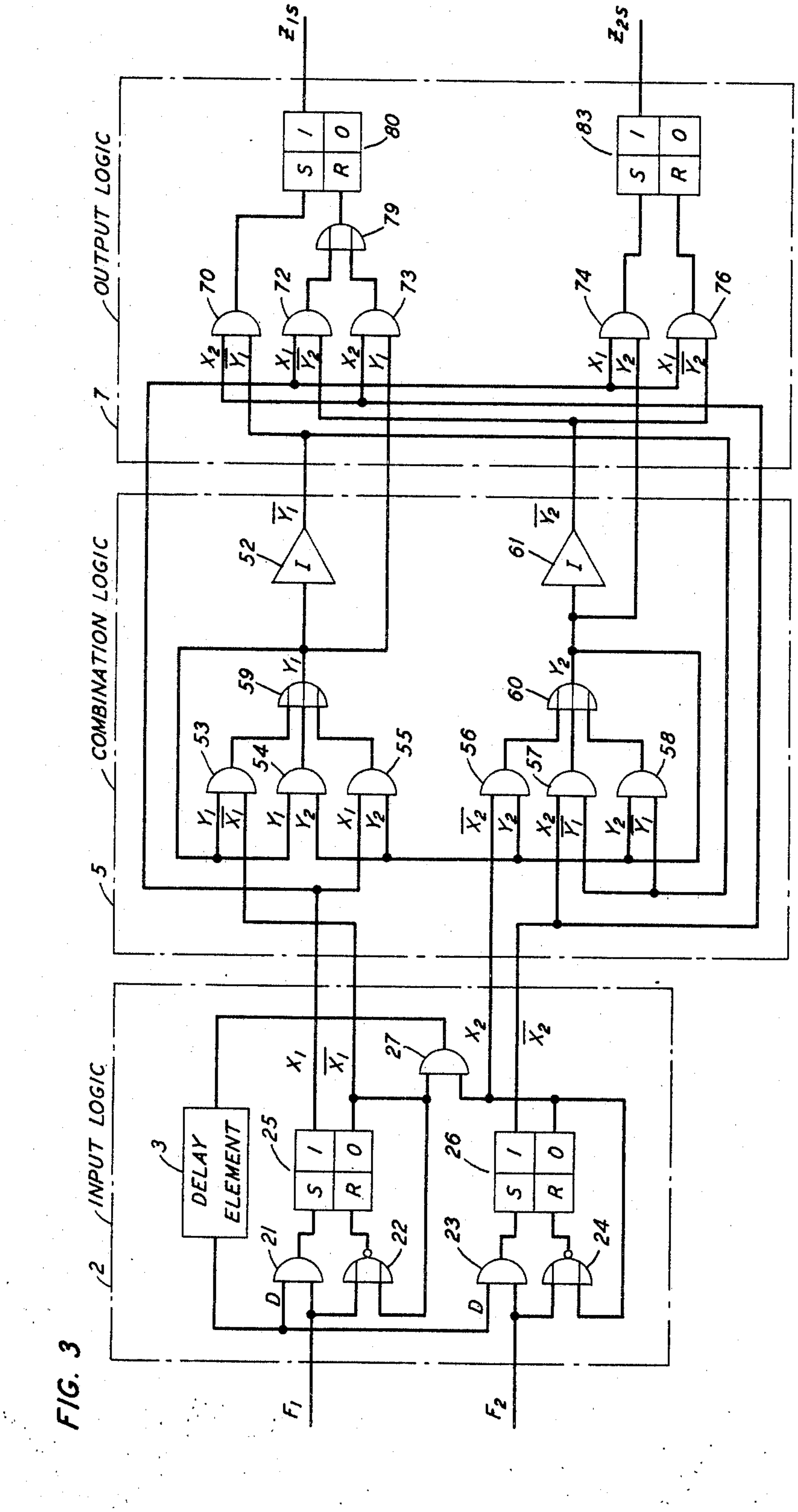
FIG. 3 shows the logic for realizing a normal mode sequential function having two inputs and two outputs.

Referring to FIG. 1, *n* input signals, $F_1$–$F_n$, are introduced into the input logic 2 on *n* lines 1. When the internal state of the circuit, represented by the Y signals, is a stable state and the input signals F are not changing, the X, Y and Z signals also remain unchanged. During a stable state, the X signals are introduced into the combination logic 5 where they are combined with Y signals, fed back over a nondelay feedback loop 4, to maintain the circuit in its existing internal state. Additionally, the Y signals (FIG. 1). There are two general types of haz- the X signals are introduced into the output logic 7 and are used to determine the circuit output signals Z. This stable condition will continue until the value of an input signal on one of the F lines changes.

The problem of hazards arises when a change in the variables occurs and results in an internal state transition by the circuit which is manifested by an alteration of the Y signals (FIG. 1). There are two general types of hazards; a transient hazard and a steady state hazard. The transient hazard appears as temporarily incorrect output signals Z (FIG. 1) during the internal state transition of a circuit. This can be caused by the Y signals temporarily taking on values differing from those imposed by the design requirements during the transition. However, after the internal state transition is complete, both the terminal stable internal state and the circuit output will be correct.

The steady state hazard, on the other hand, is a condition which can result in the circuit entering and remaining in the wrong internal state after a change in input has occurred. In other words, some of the Y signals (FIG. 1) take on incorrect values during the transition and remain incorrect after the transition is completed. Since the circuit output signals Z are functions of the circuit's internal state, the output signals Z will also be incorrect. Obviously, such deviations from design requirements cannot be tolerated if the circuit output is to be used in a meaningful way.

Both types of hazards can result from unequal transmission delays inherent in the circuit itself, unless particular care is taken in the assignment of the variables used to represent the various internal circuit states and the circuit output signals. Additionally, care must be used in selecting the logic terms used to drive the combinational logic 5 and the output logic 7.

An example of how a steady state hazard can arise if care is not used may be illustrated as follows: Assume that all the past inputs to the input logic 2 (FIG. 1) were "0" except for $F_n$, which was equal to "1," and that they have now changed so that $F_1$ is a "1" and the others, $F_2$–$F_n$, are all "0." If the change in $F_1$, represented by the signal $X_1$, is delayed in reaching the combination logic, there is a chance that one or more of the Y signals will have changed state before it arrives due to the change in $F_n$. This being the case, the Y signals no longer represent the past inputs to the circuit. Therefore, when $X_1$ arrives at the combination logic 5, it cannot be combined with signals representing the past circuit input to determine the present internal state of the circuit. Instead, the $X_1$ signal may be combined with the erroneously altered Y signals in such a way that there is a state transition to a terminal state which does not coincide with the design requirements. Consequently, due to the circuit being in the incorrect internal state, the circuit output signals Z (FIG. 1) will not give a correct indication of the change in input variables.

Similarly, an example of a transient hazard may be illustrated by assuming the same input change as above; plus, for this case, by also assuming that the inherent transmission delay is in the path transmitting the signal $X_1$ (FIG. 1) to the output logic 7. Under these assumptions the change in input will result in the Y signals reflecting the correct internal state of the circuit as long as no steady state hazard exists. The Y signals, plus the "1" to "0" change in $F_n$ (FIG. 1), reflected as $\overline{X}_n$, will arrive at the output logic 7 before the "0" to "1" change in $F_1$ since the $X_1$ signal representing this change is delayed. When this occurs, it is possible for some combination of the Y signals and the existing $\overline{X}_1$ and $\overline{X}_n$ signals to enable the output logic, giving an erroneous indication of the change in circuit input. The output signals Z will be incorrect since they result from a combination of signals erroneously representing the change in circuit input, $\overline{X}_1$ and $\overline{X}_n$, and the correct present internal state of the circuit. This erroneous output, however, is only temporary and it will be corrected when the "0" to "1" change of $F_1$ has had time to traverse the $X_1$ path to the output unit 7 (FIG. 1). When this occurs, the X signals will correctly reflect the change in circuit input and output unit 7 will combine them with the present internal circuit state to generate the correct circuit output signals. In applicants' invention such transient hazards are eliminated by careful selection of the logic terms used to enable the output logic 7.

Hazard free operation is accomplished in applicants' invention in the following manner: First, by using all the prime implicants of the logic function being realized to generate the Y signals (FIG. 1). A prime implicant is any term of a logic function which consists of a set of literals B such that if all of the literals in B are true, the function will be true; and all of the literals in any proper subset of B can be true without making the function true.

For example, if a logic function A can be represented as $A=C\cdot D\cdot E+\overline{C}\cdot D\cdot E$, then $A=D\cdot E(A+\overline{A})$ and this reduces to $A=D\cdot E$. Here $D\cdot E$ is a prime implicant of A and the literals D and E comprise the set of literals B mentioned in the above definition. The set B has two proper subsets; one consisting of the literal D and the other consisting of the literal E. Applying the above definition, if both D and E are true then A will be true. On the other hand, if only the proper subset consisting of D is true, the function A will not be true since the logic term $D \cdot E$ will not be true. Similarly, if only the proper subset consisting of C is true, the function A will not be true.

In addition to the above, memory pulses are provided on the X lines, after an input change, of a duration equal to the delay provided by delay element 3 (FIG. 1). The delay provided by delay element 3 is that which is necessary to allow for a change in the F inputs and the circuit response to the change in inputs.

The memory signals on the X lines 10 (FIG. 1) are applied to the output logic 7 where they result in the output signals Z remaining unchanged until the memory signals are replaced by signals representing the change in input. Additionally, the memory signals used on the X lines 10 are chosen so that they will not effect the combination logic 5. This insures that the Y signals (FIG. 1) remain unchanged for the duration of the memory signals.

More specificaly, support that the past input to the circuit has been $F_1$ (FIG. 1) equal to "1" and $F_2$ through $F_n$ equal to "0" but it has now changed to $F_1$ through $F_{n-1}$ equal "0" and $F_n$ equals "1." When this change in input occurs, the $F_1$ "1" to "0" change will be immediately reflected on line $X_1$ (FIG. 1). The $F_n$ "0" to "1" change, however, will not be reflected on the $X_n$ line for an interval equal to the delay provided by delay element 3. Consequently, during the delay interval all the X lines 10 (FIG. 1) will all have a "0" signal on them. This all "0" condition on the X lines 10 maintains the combination logic 5 and the output logic 7 in the same condition they were in prior to the change in input signals on the F lines 1.

Upon the expiration of the delay interval the input logic 2 responds to the "1" on $F_n$ by changing $X_n$ to a "1." However, the combination logic 5 and output logic 7 will remain unchanged until $X_n$ actually reaches them. When $X_n$ reaches the combination logic 5 selected gates will be enabled and disabled, resulting in a change in the Y signals. Similarly, the output logic 7 will remain unchanged until both the newly altered Y signals and the $X_n$ signal arrive. This is all accomplished by careful selection of the logic terms used to generate the Y and Z signals (FIG. 1). When the altered Y signals and $X_n$ reach the output logic 7, selected gates respond, changing the signals on the Z lines 9 from a configuration representing the past inputs to the circuit directly to one representing the present circuit inputs.

Consequently, by using memory signals of a prescribed duration in this manner, both steady state and transient hazards are eliminated from the circuit operation. In essence, both types of hazards are eliminated by the elimination of any possibility of a race between the X and Y signals. The X signal changing from "0" to "1" is always combined with only those Y signals which remain unchanged, for the particular state transition taking place, to alter the combination logic 5 and the output logic 7 signals.

DESCRIPTION OF THE SEQUENTIAL FUNCTIONS

As was mentioned earlier, applicants' invention provides hazard free operation for all normal mode sequential functions. A normal mode sequential function is defined as a function that can be represented by a flow table in which the transition from any unstable state is directly to a stable state. FIG. 4 shows a flow table for such a function.

Referring to FIG. 4 the "0" and "1" columns represent the two values the input X may take. The numbers appearing under the subcolumn heading "state" represent state designations. A number in this column subscripted with an "*s*" indicates that it is a stable state. If there is no "*s*" subscript the state designation represents an unstable state. The numbers under the subcolumn heading "$Z_{1s}Z_{2s}$" represent the binary output of the circuit used to realize the function when its internal state is represented by the state designation located in the same row under the adjacent state column. The numbers under the "$Y_1Y_2$" subcolumn indicate the combination logic feedback signal values. These feedback signals are a function of the circuit inputs and represent the internal circuit state.

When a circuit used to realize the funciton in the flow table is in a stable state and its input value is the value shown immediately above the stable state, no state transition will occur. For example, if a circuit used to realize the function in the flow table in FIG. 4 is in the $\mathbf{1}_s$ stable state and the X input is "0," the circuit state will remain $\mathbf{1}_s$. In other words, the Y signals will remain unchanged. On the other hand, if the circuit is in the stable state $\mathbf{1}_s$ and the X input becomes "1" there will be a state transition. The state of the circuit will change from $\mathbf{1}_s$ to unstable state 2 and then to stable state $\mathbf{2}_s$ if its operation involves no hazards. It will be noted that the Y signals change from "00" for the $\mathbf{1}_s$ state to "01" for the $\mathbf{2}_s$ state.

An example of the circuit operation described by the flow table in FIG. 4 is as follows: Assuming the circuit is in the $\mathbf{1}_s$ state with an output of "00" and the X input takes a value of "1," the circuit state will change to unstable state 2 with a resultant change to "10" in circuit output. In unstable state 2 the feedback signal $Y_2$ is unstable and will ultimately change to "1." Consequently, the terminal state of the circuit for this transition will be the stable state $\mathbf{2}_s$. While the circuit is in the $\mathbf{2}_s$ state and X input equal to "1" will have no effect. However, if X takes the value "0" while the circuit is in the $\mathbf{2}_s$ state, there will be a transition from $\mathbf{2}_s$ to unstable state 3 where $Y_1$ is unstable and finally to stable state $\mathbf{3}_s$ when $Y_1$ becomes a "1." When the $\mathbf{2}_s$ to 3 transition occurs the circuit output is to become "11" and remain so during the $\mathbf{3}_s$ state. Similarly, if X becomes "1" while the circuit is in the $\mathbf{3}_s$ state there is a transition to the stable state $\mathbf{4}_s$ by way of unstable state 4. During the 4 and $\mathbf{4}_s$ states the circuit output is "01."

Problems arise in realizing the sequential function shown in FIG. 4 if the circuit used to realize it creates a potential race condition between a change in the circuit input F (FIG. 3) and a change in the feedback signals Y (FIG. 3). A race condition is a condition where the terminal state in a circuit state transition depends on the order in which the circuit sees the changes in input and feedback signals. This is undesirable since such a circuit may not operate according to design requirements. Such a condition results from transmission delays inherent in the circuit.

The effect of a race condition may be illustrated by referring to FIG. 4 and assuming that the circuit is in the $\mathbf{1}_s$ state when X changes from "0" to "1." If the circuit is such that the change in X results in the feedback signal $Y_2$ becoming "1" before the X change is seen by the rest of the circuit, there is a transition from stable state $\mathbf{1}_s$ to unstable state 3. This differs from the desired transition which, as was discussed above, would be the transition $\mathbf{1}_s$ to 2 if there was no X–$Y_2$ race present. When the circuit is in the 3 state, $Y_1$ is unstable and changes from "0" to "1" resulting in the state transition 3 to $\mathbf{3}_s$. The circuit will remain in stable state $\mathbf{3}_s$ until the delayed change in X is seen by the rest of the circuit. When this occurs there is a state transition from $\mathbf{3}_s$ to 4 to $\mathbf{4}_s$; where $\mathbf{4}_s$ represents the terminal state in the transition resulting from the "0" to "1" change in X. This, however, is an incorrect terminal state. As was shown above, in the absence of the race condition, the terminal state would have been $\mathbf{2}_s$.

Race conditions can be eliminated by insuring that the $Y_1$ and $Y_2$ feedback signals (FIG. 4) do not change until after a change in input is seen by the combination circuitry 5 (FIG. 1) which combines the input signals with the feedback signals to determine the present internal circuit state. Additionally, in the illustrative example in FIG. 4, it is also necessary to insure that one of the feedback signals Y (FIG. 3) remains stable during any transition. In the more general case, however, where more than two feedback signals are used, it is possible for a number of the feedback signals to change simultaneously during a transition while one or more of the feedback signals remain stable.

The above can be accomplished by first redefining the function shown in FIG. 4 in such a way that a change in input results in an initial transition from the existing stable state to a second stable state. In this second stable state the Y feedback signals (FIG. 4) remain unchanged until all of the input variables have changed and are available to the circuit to be combined with the Y signals.

The flow table in FIG. 5 represents a redefinition of the function represented in FIG. 4 which satisfied the above requirements. It will be noted that there is a third column in this flow table. This column represents the stable states of a circuit existing after an input change and before the new input is available to the circuit to be used in determining its new internal state. The inputs have been redefined as two-bit inputs to accommodate the three columns. The states in the leftmost column with "*sm*" subscripts represent the newly defined intermediate stable state. In addition to the Y feedback signals remaining stable during this intermediate state, the circuit output also remains unchanged. This redefinition eliminates both steady state hazards and transient hazards by eliminating any race between X and Y signals (FIG. 1).

A circuit used to realize the function defined in the flow table in FIG. 5 would operate in approximately the same manner as a circuit used to realize the function shown in FIG. 4, with one exception. That exception is, the former would always pass through one of the intermediate stable states during a transition to its terminal state. Referring to FIG. 5, if the circuit is in the $\mathbf{1}_s$ state and the signals on the F lines (FIG. 3) change from "10" to "01" there is a state transition from $\mathbf{1}_s$ to $\mathbf{1}_{sm}$. The circuit state remains $\mathbf{1}_{sm}$ until the change in input represented by $X_1$ and $X_2$ is available to the combination circuitry 5 (FIG. 1) which combines the input signals and the Y feedback signals. When this occurs the presence of "01" results in a state transition from $\mathbf{1}_{sm}$ to 2 to $\mathbf{2}_s$ where $\mathbf{2}_s$ is the correct terminal state. Similarly, if during the $\mathbf{2}_s$ state the input changes from "01" to "10," the initial state transition $\mathbf{2}_s$ to $\mathbf{2}_{sm}$ occurs; and when the "10" input change becomes available the transition from $\mathbf{2}_{sm}$ to 3 to $\mathbf{3}_s$ occurs. Consequently, it is apparent that the function represented in FIG. 5 is fundamentally the same as the function in FIG. 4.

Referring to FIG. 5 the following logic equation may be written for the feedback signals $Y_1$ and $Y_2$:

$$Y_1 = X_1 \cdot Y_2 + \overline{X}_1 \cdot Y_1 + Y_1 \cdot Y_2 \quad (1)$$

$$Y_2 = X_2 \cdot \overline{Y}_1 + \overline{X}_2 \cdot Y_2 + \overline{Y}_1 \cdot Y_2 \quad (2)$$

It will be noted that the logic terms in both of these equations represent all of the prime implicants of the particular function being implemented. This is necessary to avoid transients in the Y signals which result in steady state hazards.

Similarly, FIG. 5 also yields the following input equations for the circuit output flip-flops 80 and 83 (FIG. 3):

$$Z_{1r} = X_2 \cdot Y_1 + X_1 \cdot \overline{Y}_2 \quad (3)$$

$$Z_{1s} = X_2 \cdot \overline{Y}_1 \quad (4)$$

$$Z_{2r} = X_1 \cdot \overline{Y}_{21} \quad (5)$$

$$Z_{2s} = X_1 \cdot Y_2 \quad (6)$$

Using these equations it is possible to realize the normal mode function represented by FIG. 5 in the form of the logic circuitry shown in FIG. 3.

DETAILED DESCRIPTION OF CIRCUIT OPERATION

It will be noted that the circuit in FIG. 3 has only two inputs $F_1$ and $F_2$. Obviously, the circuit could be extended to accommodate *n* inputs as is shown in FIG. 1. The two input configuration is used because it fully discloses the operation of applicants' invention and avoids the redundancy inherent in the explanation of a circuit having more than two inputs.

As mentioned earlier, the F inputs (FIG. 3) are logic functions. In other words, $F_1$ (FIG. 3) can represent a particular combination of the set A containing the logic variables $(a_1, a_2, \ldots, a_n)$. The invention allows more than one of the variables in the A set to change simultaneously in changing from $F_1$ to $F_2$ as long as the last variable to change does so within the interval provided by the delay element 3 (FIG. 3). For example, $F_1$ could be defined by the function $(\overline{a}_1, \overline{a}_2, a_3, \ldots, a_n)$ and $F_2$ could be defined as $(a_1, a_2, \ldots, \overline{a}_{n-1}, \overline{a}_n)$. If this were the case, a simultaneous change in four of the logic variables would be required to switch from $F_1$ to $F_2$ or vice versa.

For purposes of discussion, it will be assumed that the circuit in FIG. 3 is in the $\mathbf{1}_s$ state (FIG. 5) with an input of "10" and having an output of "00." The $\mathbf{1}_s$ state (FIG. 5) is a stable state for a "10" input. Consequently, the circuit will remain in the $\mathbf{1}_s$ state as long as its input is "10" and the circuit output will be a steady "00" (FIG. 5).

When the circuit input changes as a result of a change in the logical variables represented by the F inputs (FIG. 3) in such a way that "01" is presented, a transition in the circuit's internal state will occur. Referring to FIG. 5 such a change in input results in the circuit's internal state changing from $\mathbf{1}_s$ to $\mathbf{1}_{sm}$, a memory state. This is accomplished by the input logic 2 (FIG. 3). Initially as a result of $F_1$ being a "1" the flip-flop 25 (FIG. 3) is ON, making $X_1$ a "1." Similarly, $F_2$ being a "0" results in flip-flop 25 being OFF, making $X_2$ a "0." When the input changes from "10" and "01" (FIG. 3), the "0" on line $F_1$ results in flip-flop 25 being immediately reset. However, the "1" on line $F_2$ does not result in flip-flop 26, which is in the reset state, being immediately set. Flip-flop 26 will not be set for an interval equal to the delay provided by delay element 3 (FIG. 3). During this interval both $X_1$ and $X_2$ will be "0" and the circuit will be in the $\mathbf{1}_{sm}$ state in column "00" of FIG. 5.

When $F_1$ (FIG. 3) goes to "0" this "0" along with the "0" output of the reset side of flip-flop 25 immediately enable NOR gate 22. The "1" output of gate 22 (FIG. 3) is applied to the reset side of flip-flop 25 resulting in it being reset. When this occurs, $X_1$ becomes a "0" and $\overline{X}_1$ becomes a "1." The $\overline{X}_1$ true condition is applied to AND gate 27.

The other input to gate 27 (FIG. 3) is from the reset side of flip-flop 26. As was noted above, flip-flop 26 was in its reset state before the change in the F inputs. Consequently, $\overline{X}_2$ will be a "1". The presence of a "1" on both the $\overline{X}_1$ and $\overline{X}_2$ lines results in gate 27 being enabled.

The "0" to "1" change in $F_2$ (FIG. 3) has no immediate effect on flip-flop 26 because the input AND gate 23 for the set side of the flip-flop requires both $F_2$ and the signal D (FIG. 3) to be "1" before it is enabled. Since gate 27 was OFF prior to the change in the F inputs, D will be "0" and remain "0" for an interval equal to the delay provided by delay element 3, after the change in input results in gate 27 being enabled. Therefore, both $X_1$ and $X_2$ will be "0" for an interval equal to the delay interval. During this interval both the combination logic 5 (FIG. 3) and the output logic 7 remain unchanged and the circuit output continues to be "00" (FIG. 5). This is verified by examining Equations 1 through 6 which show that no combination of $\overline{X}_1$, $\overline{X}_2$, $\overline{Y}_1$ and $\overline{Y}_2$ will effect either the combination or output logic.

After a period equal to the delay interval, the "1" resulting from gate 27 (FIG. 3) being enabled is felt at gate 23. This, in conjunction with the "1" input of $F_2$, enables gate 23 which, in turn, results in flip-flop 26 being set. When this occurs, gate 27 is turned OFF and the signal $X_2$ becomes a "1." Flip-flop 25 (FIG. 3) remains in its reset state since $F_1$ is a "0." At this point $X_1$ is a "0" and $X_2$ is a "1." This corresponds to a transition from the $\mathbf{1}_{sm}$ state in the "00" column of the flow table in FIG. 5 to the unstable 2 state in column "01."

When the "1" on line $X_2$ reaches gate 57 (FIG. 3) along with the "0" on line $Y_1$, generated by inverter 52, gate 57 is enabled. This gate in turn enables OR gate 60 (FIG. 3) whose "1" output represents $Y_2$ as true. It will be noted that the inherent delay encountered in transmitting the "1" along line $X_2$ from flip-flop 26 to gate 57 has no effect on which of the gates in the combination logic 5 is enabled. Referring to Equations 1 and 2 above, for the condition $X_1=0$, $X_2=1$, $Y_1=0$, and $Y_2=0$, only gate 57 can be enabled and it is enabled by the logic term $X_2 \cdot \overline{Y}_1$. Since during a state transition from $\mathbf{1}_s$ to $\mathbf{2}_s$, the signal $Y_1$ (FIG. 5) is stable and remains "0," the only variable involved in enabling gate 57 is $X_2$ itself. In other words, there is no race between the signal on $X_2$ and the $Y_1$ feedback signal since $Y_1$ does not change in this transition. Consequently, the only result of a high inherent transmission delay of the "0" to "1" change in $X_2$ is that the combination logic 5 remains in its pre-existing state a longer time.

Similarly, the change in the circuit output is dependent only on the change in $X_2$. For the given conditions, Equations 3 and 6 show that only flip-flop 80 will be changed and it is changed by the logic term $X_2 \cdot \overline{Y}_1$. Since $Y_1$ remains "0" during the $\mathbf{1}_s$ to $\mathbf{2}_s$ state transition (FIG. 5), the setting of flip-flop 80 is dependent only on the arrival of the "1" on line $X_2$. Consequently, there will be no unstable output signals resulting from a race between X and Y signals. As long as the "0" to "1" change in $X_2$ is not available at gate 70 (FIG. 3) the output flip-flops will remain in their pre-existing states, $Z_{1s}=0$ and $Z_{2s}=0$. That is, none of the gates 70 through 76 (FIG. 3) will be ON and this results in "0" being applied to both the set and reset sides of the flip-flops. The flip-flop truth table in FIG. 2 shows this results in the flip-flops remaining unchanged.

When the "0" to "1" change in $X_2$ does arrive at gate 70 (FIG. 3), the circuit ouput will change directly to "10" (FIG. 5). This is accomplished by the condition $X_2=1$, $Y_1=0$ enabling gate 70. The "1" output of gate 70 is applied to the set side of flip-flop 80 which sets the flip-flop and results in $Z_{1s}$ becoming a "1."

The enabling of gate 60, indicating $Y_2$ true, and the setting of flip-flop 80 to get a circuit output of "10" corresponds to the transition from unstable state 2 to stable state $\mathbf{2}_s$ in FIG. 5.

In the $\mathbf{2}_s$ state (FIG. 5) $X_1=0$, $X_2=1$, $Y_1=0$, $Y_2=1$ are true. Equation 2 above shows that $Y_2=1$ will be maintained by $X_2=1$, $Y_1=0$ or $Y_1=0$, $Y_2=1$. Returning to FIG. 3, both gate 57 and gate 58 are enabled, either of which will keep OR gate 60 enabled. The $Y_2=1$ condition and the "10" output of flip-flops 80 and 83 will continue as long as the circuit remains in the $\mathbf{2}_s$ or $\mathbf{2}_{sm}$ state (FIG. 5).

With the circuit in the $\mathbf{2}_s$ state (FIG. 5) a change in input such that the existing input condition $F_1=0$, $F_2=1$ (FIG. 3) changes to the condition $F_1=0$, $F_2=1$ will result in a state transition from $\mathbf{2}_s$ to $\mathbf{2}_{sm}$ to 3 to $\mathbf{3}_s$ (FIG. 5).

The operation of the input logic 2 (FIG. 3) is essentially the same for this change in input as it was for the change described above. When $F_2$ goes to "0," this "0," together with the "0" fed back from the reset side of flip-flop 26, which is set, will result in a "1" being generated by NOR gate 24. This immediately resets flip-flop 26. The $F_1=1$ condition (FIG. 3) does not results in flip-flop 25 being immediately set since gate 27 has been OFF, resulting in D being "0." Consequently, both $X_1$ and $X_2$ go to "0" and the circuit state becomes $\mathbf{2}_{sm}$ (FIG. 5).

Here again, during the delay interval in which $X_1$ and $X_2$ are "0," the signals of the combination logic 5 and output logic 7 remain unchanged. Although $F_2$ (FIG. 3) going to "0" results in $X_2$ going to "0" immediately and gate 57 being disabled, $Y_2$ is maintained by gates 56 and 58 which are enabled by $Y_1=0$, $Y_2=1$ and $X_2=0$, $Y_2=1$, respectively. There is no possibility of a race here since $\overline{Y}_1 \cdot Y_2$ was true prior to this change in input.

As was mentioned previously, reference to Equation 1 for $Y_1$ shows that it will remain a "0" during the interval in which both $X_1$ and $X_2$ are "0." Additionally, the output flip-flops 80 and 83 will remain unchanged since $X_1$ and $X_2$ being "0" results in "0's" being applied to both their set and reset sides.

Both the flip-flops 25 and 26 (FIG. 3) being in the reset condition result in gate 27 being enabled and, after a period equal to the delay interval, the signal D becomes a "1." When this occurs, the signal D combines with the $F_1$ signal to enable gate 21 which, in turn, sets flip-flop 25. Flip-flop 25 (FIG. 3) being set changes $X_1$ to a "1" and results in gate 27 being disabled. At this point the circuit is in the unstable state 3 shown in FIG. 5.

The possibility of inherent transmission delays giving rise to an X–Y race condition has been eliminated by having both gates 56 and 58 (FIG. 3) enabled to maintain $Y_2$. The logic term $Y_2=0$, $Y_2=1$ which enabled gate 56 makes the generation of $Y_2$ independent of the value of $Y_1$ or $X_1$. Consequently, $Y_2$ (FIG. 3) is stable during the transition.

No change in $Y_1$ will occur until the "0" to "1" change in $X_1$ arrives at gate 55. When this occurs gate 55 is enabled by the logic term $X_1=1$, $Y_2=1$. Since $Y_2$ is stable, $X_1$ is the only variable involved in generating $Y_1$ and therefore, there can be no race in generating $Y_1$. The "1" output of gate 58 enables OR gate 59 (FIG. 3) which in turn generates the signal $Y_1$.

The $Y_1$ (FIG. 3) condition results in gate 54 being enabled by $Y_1=1$, $Y_2=1$. It will be noted that OR gate 59 now has two "1" inputs; one from gate 54 which is independent of the value of $X_1$ and one from gate 55 which is dependent upon the value of $X_1$. Additionally, the existence of the condition $Y_1=1$ disables gate 58 since $\overline{Y}_1$ is no longer true. However, this does not result in the condition $Y_2=0$ since, as was mentioned above, the pre-existing condition $X_2=0$, $Y_2=1$ has enabled gate 56 whose output is also an input to OR gate 60. At this point the condition $X_1=1$, $X_2=0$, $Y_1=1$, and $Y_2=1$ exists.

Referring to FIG. 5, the circuit output for either unstable state or stable state $\mathbf{3}_s$ is $Z_{1s}=1$ and $Z_{2s}=1$ or "11." Returning to FIG. 3, gate 74 is enabled by $X_1=1$, $Y_2=1$. Here again, the possibility of an unstable output during the state transition has been eliminated by using the $Y_2$ signal, which is stable during this transition, as one of the terms to set the output flip-flop 83 (FIG. 3). Flip-flop 80 does not need to be set since it is already set as a result of the previous existence of the $\mathbf{2}_s$ state (FIG. 5). Until the "0" to "1" change of $X_1$ reaches gate 74, the inputs to the set and reset sides of both output flip-flops 80 and 83 are "0," maintaining them in their pre-existing state "10" (FIG. 5). When the "0" to "1" change in $X_1$ does arrive, it enables gate 74, resulting in the gate being enabled. When gate 74 is enabled, flip-flop 83 (FIG. 3) is set and the signal $Z_{2s}$ goes from a "0" to a "1." After flip-flop 83 has been set the output of the circuit is $Z_{1s}=1$ and $Z_{2s}=1$ or "1."

The circuit has now gone from the $\mathbf{2}_s$ state (FIG. 5) to the $\mathbf{2}_{sm}$ state to the unstable 3 state and is at this time in the $\mathbf{3}_s$ state. It will remain in the $\mathbf{3}_s$ state until the F inputs (FIG. 3) change from "10" to "01."

FIG. 5 indicates that when the F inputs (FIG. 3) change from "10" to "01" the following circuit state transition will occur; from $\mathbf{3}_s$ to $\mathbf{3}_{sm}$ to unstable 4 and finally to $\mathbf{4}_s$. When $F_1$ goes to "0" and $F_2$ goes to "1" during the $\mathbf{3}_s$ state (FIG. 5), the input logic 2 (FIG. 3) operates in the same manner as described above for the case where the state transition was from $1_s$ to $2_s$ (FIG. 5). When $F_1$ (FIG. 3) goes to "0," both $X_1$ and $X_2$ become "0" and remain so for a period equal to the delay interval. This corresponds to the $3_{sm}$ state in FIG. 5. At the end of this interval flip-flop 26 is set and $X_2$ becomes a "1," putting the circuit in the unstable state 4 (FIG. 5).

While $X_1$ and $X_2$ are "0," $Y_1$ is maintained by gate 54 (FIG. 3) which has been enabled by the logic term $Y_1=1$, $Y_2=1$. Similarly, $Y_2$ continues to be maintained by only gate 56 (FIG. 3) which was already enabled by $X_2=0$, $Y_2=1$. In addition to gate 54, gate 53, which is enabled by $X_1=0$, $Y_1=1$, is ON when $X_1$ is "0." This gate also drives ON gate 59 which generates $Y_1$. Consequently, when $X_1$ and $X_2$ are "0," there are two AND gates enabled which result in the $Y_1$ being generated; one of these gates being independent of either of the changing variables $X_2$ or $Y_2$. Furthermore, as described in the above transitions, the output flip-flops remain unchanged as long as both $X_1$ and $X_2$ are "0." It will be recalled that in order for any one of the AND gates 70 through 76, which result in the setting or resetting of flip-flops 80 and 81, to be ON, either $X_1$ or $X_2$ must be a "1."

When $X_2$ becomes a "1" and this signal value reaches gate 56 (FIG. 3) the gate is disabled since $X_2$ is no longer "0," and $Y_2$ is no longer generated by gate 60. Referring to FIG. 5, this follows the requirement of the flow table which shows that in the unstable state 4, $Y_2$ is unstable and will eventually go to "0." When $Y_2$ goes to "0" gate 54 will no longer be ON since $Y_1$, $Y_2$ is no longer "11.". There is, however, no $X_2$–$Y_2$ race involved in generating $Y_1$ since gate 53, enabled by $X_1=0$, $Y_1=1$, has been ON since both $X_1$ and $X_2$ became "0" and remains ON. Consequently OR gate 59 which generates $Y_1$ remains ON continuously from the time $X_1$ goes to "0" and is therefore independent of the changes in $X_2$ and $Y_2$.

Similarly, the output flip-flops remain unchanged until the "0" to "1" change in $X_2$ reaches gate 73 (FIG. 3) which is enabled by the logic term $X_2=1$, $Y_1=1$. It will be noted that $Y_1$ is stable during this state transition and this makes the change in output dependent only on $X_2$. When the change in $X_2$ reaches gate 73 the gate is enabled and in turn enables OR gate 79. The output of gate 79 is applied to the reset side of flip-flop 80 and resets the flip-flop, resulting in $Z_{1s}$ going to "0." Additionally, since flip-flop 83 was set during the $3_s$ state (FIG. 5) and is to remain set during the $4_s$ state, the gates 74 and 76 remain OFF. This results in "0's" being simultaneously applied to both the set and reset sides of flip-flop 83 and it remains set.

At this point the condition $Y_1=1$, $Y_2=0$, $Z_{1s}=1$ and $Z_{2s}=1$ exists. Referring to FIG. 5, it is clear that this represents the $4_s$ state, which is the correct terminal state for the transition from $3_s$ when the F inputs (FIG. 3) change in such a manner as to make $X_1=0$ and $X_2=1$ (FIG. 5). The circuit internal state and output will remain unchanged until the F inputs (FIG. 3) change in such a way as to alter the $X_1$ and $X_2$ values shown in FIG. 5 to "10."

The last circuit state transition to be considered is the transition from $4_s$ (FIG. 5) back to $1_s$. This will put the circuit back in the stable state which was assumed at the beginning of this discussion.

When the F inputs (FIG. 3) change in such a manner that $X_1$ goes from "0" to "1" and $X_2$ goes from "1" to "0," FIG. 5 shows that there is a transition from state $4_s$ to $4_{sm}$. After remaining in the stable stabe $4_{sm}$ an interval equal to the delay interval, there is a circuit state transition to unstable state 1, where $Y_1$ is unstable, and finally to stable state $1_s$.

The operation of the input logic 2 (FIG. 3) for the "0" to "1" change in $X_1$ and the "1" to "0" change in $X_2$ while the circuit is in the $4_s$ state is the same as that explained for the $2_s$ to $3_s$ state transition above. When $X_2$ goes to "0" the $X_1$ and $X_2$ outputs of flip-flops 25 and 26 (FIG. 3) respectively go to "0" and remain so for an interval equal to the delay interval. Here, as in the above transitions, neither the Y signals of the combination logic 5 (FIG. 3) nor the Z signals of the output logic 7 change.

After the expiration of the delay interval the flip-flop 25 (FIG. 3) is set and $X_1$ goes to a "1." Until this change reaches gate 53 (FIG. 3), the $Y_1=1$ condition which existed during the $4_s$ state is maintained by this gate since the condition $X_1=0$, $Y_1=1$ will be true. None of the other gates 54 through 58 will be ON at this time. When the "0" to "1" change in $X_1$ reaches gate 53 that gate is turned OFF and as a result, OR gate 59 goes OFF. Consequently $Y_1$ will go to "0" and $Y_2$ is already at "0." Referring to FIG. 5, the $Y_1=0$, $Y_2=0$ condition indicates that the circuit is back in the $1_s$ state.

Similarly, the output logic 7 will respond when the "0" to "1" change in $X_1$ reaches gate 76 (FIG. 3) which resets flip-flop 83. The existence of $X_1=1$, $Y_2=0$, where $Y_2$ is stable during this transition, enables gate 76 which results in $Z_{2s}$ going from "1" to "0." Flip-flop 80, which was in a reset state during the $4_s$ state (FIG. 5), remains reset since none of the gates 70 through 73 (FIG. 5) are enabled. The resulting $Z_{1s}=0$, $Z_{2s}=0$ condition represents the "00" circuit output which, according to FIG. 5, is the correct output during the $1_s$ state. Consequently, the transition from stable state $4_s$ to stable state $1_s$ is complete and has occurred as indicated in FIG. 5.

The logic term $X_1 \cdot \overline{Y_2}$ in Equations 3 and 5 insures that when the circuit in FIG. 3 is turned ON and the initial input of "10" (FIG. 5) is applied, the output flip-flops 80 and 83 (FIG. 3) will both be reset. In other words, this term provides initialization for the output flip-flops which may come on randomly in a set or reset condition.

The above discussion has shown how a normal mode sequential function such as that shown in FIG. 4 may be realized by logic circuitry, using a single delay element, which will provide hazard free operation. Additionally, the circuitry will provide hazard free operation whether its inputs are a function of a single logical variable or a function of a number of logical variables which change simultaneously. The only restriction placed upon the circuit, where its inputs involve the simultaneous change of a number of logical variables, is that all of the variables that change do so within an interval equal to the delay interval for any given change in input. Finally, the invention allows the simultaneous change of more than one of the feedback variables Y (FIG. 1) during a transition.

It is to be understood that the above-described arrangements are merely illustrative of the numerous and various other arrangements which may form applications of the principles of the invention. These other arrangements may readily be devised by those skilled in the art without departing from the spirit and scope of the invention.

What is claimed is:

1. An asynchronous sequential circuit comprising sequential switching logic and output logic, the circuit being characterized in that a plurality of circuit input signals are connected to input logic which generates a temporary signal when a change in the input signals occurs and responds to the temporary signal fed back through a single delay element as an enable signal to provide a delayed transmission of the change in the circuit input signals to the sequential switching logic and output logic.

2. In combination:

a plurality of signal generating means, each initially responsive to a selected change in a selected one of the circuit input signals, for generating a preselected temporary signal pattern;

means responsive to said temporary signal pattern for generating a temporary enable signal; and gating means for combining the delayed enable signal with each of said circuit input signals;

each of said plurality of signal generating means being further responsive to a selected output of a selected one of said gating means for altering said temporary signal pattern to reflect the current circuit input.

3. In combination:

means including a single delay element for delaying the transmission of a change in a plurality of circuit input signals;

switching means for selectively combining the current output signals of said switching means with the delayed input signals to alter said current output signals; and output means for combining selected ones of said delayed input signals with selected ones of the switching means output signals to generate circuit output signals.

4. The combination of claim 3, wherein said switching means includes a plurality of its output signals connected directly to its input as input signals.

5. In combination:

a single delay input means responsive to a change in a plurality of circuit input signals for generating delayed input signals;

switching means for switching from one of a plurality of stable states to a predetermined second stable state when selected combinations of its current output signals and said delayed input signals occur; and output means, responsive to selected combinations of the switching means output signals and said delayed input signals, for generating circuit output signals.

6. In combination:

means for delaying the transmission of a change in circuit input signals;

combination means for realizing a normal mode sequential function, which means is responsive to the delayed input signals;

output means, responsive to selected combinations of the delayed input signals and the output signals of said combination means, for generating circuit output signals.

7. The combination of claim 6, wherein said combination means is responsive to sets of signals representing prime implicants of said normal mode sequential function.

8. An asynchronous sequential circuit comprising:

means for generating a temporary enable signal in response to a change in circuit input signals;

means for delaying said enable signal;

means for combining the delayed enable signal with said circuit input signals to generate delayed input signals;

switching means for combining selected ones of its current output signals with selected ones of said delayed input signals to alter its output signals; and output means, responsive to selected combinations of said output signals of said switching means and said delayed input signals, for generating circuit output signals.

9. The asynchronous circuit of claim 8, wherein said means for delaying said enable signal comprises a delay element connected in a path from said means for generating said enable signal to said means for combining said enable signal with said circuit input signals.

10. An asynchronous sequential circuit comprising:

means for delaying the transmission of a change in circuit input signals;

means, responsive to said change in said circuit input signals, for generating temporary inhibit signals;

switching means for combining selected ones of its current output signals with selected ones of the delayed input signals to alter its output;

means for maintaining the existing circuit output signals for the duration of said inhibit signals; and means for altering said circuit output signals when said inhibit signals are replaced by said delayed input signals.

11. The asynchronous sequential circuit of claim 10, wherein said temporary inhibit signals are applied to said switching means.

12. An asynchronous sequential circuit comprising sequential switching logic and output logic, the circuit being characterized in that a plurality of input signals are connected to input circuitry comprising means for generating a temporary signal in response to a change in input signals, a feedback path which includes a delay element for transmitting the temporary signal, means responsive to the delayed temporary signal for applying the input signals to the sequential switching logic and output logic.

References Cited

UNITED STATES PATENTS 2,760,087 8/1956 Felker ............ 307—208

DONALD D. FORRER, Primary Examiner

D. M. CARTER, Assistant Examiner

U.S. Cl. X.R.

307—203, 208